United States Patent
Williams et al.

(10) Patent No.: US 6,411,735 B1
(45) Date of Patent: Jun. 25, 2002

(54) METHOD AND APPARATUS FOR DISTINGUISHING BETWEEN NOISY CONTINUOUS TONE DOCUMENT TYPES AND OTHER DOCUMENT TYPES TO MAINTAIN RELIABLE IMAGE SEGMENTATION

(75) Inventors: Leon C. Williams, Walworth; Raymond J. Clark, Webster; Stuart A. Schweid, Pittsford, all of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/158,868

(22) Filed: Sep. 23, 1998

(51) Int. Cl.$^7$ .................................................. G06K 9/62
(52) U.S. Cl. ...................................... 382/224; 382/173
(58) Field of Search ................................ 382/224, 225, 382/226, 227, 228, 229, 220, 173, 176, 180; 358/462

(56) References Cited

U.S. PATENT DOCUMENTS

| | | | | |
|---|---|---|---|---|
| 4,194,221 A | * | 3/1980 | Stoffel | 358/280 |
| 5,293,430 A | * | 3/1994 | Shiau et al. | 382/42 |
| 5,748,776 A | * | 5/1998 | Yoshida | 382/195 |
| 6,185,328 B1 | * | 2/2001 | Shiau | 382/173 |

* cited by examiner

*Primary Examiner*—Andrew W. Johns
*Assistant Examiner*—Seyed Azarian
(74) *Attorney, Agent, or Firm*—Fay, Sharpe, Fagan, Minnich & McKee, LLP

(57) ABSTRACT

A method and apparatus are disclosed for distinguishing noisy continuous tone document types from other document types such as halftone or text, in order to maintain reliable image segmentation. In both cases a Range of Video microclassifier is added to the other microclassifiers (Sij, estimated halftone frequency, etc.) to disqualify noisy continuous tone images from being incorrectly classified as other document types such as halftone or text document types.

11 Claims, 3 Drawing Sheets

METHOD AND APPARATUS FOR DISTINGUISHING BETWEEN NOISY CONTINUOUS TONE DOCUMENT TYPES AND OTHER DOCUMENT TYPES TO MAINTAIN RELIABLE IMAGE SEGMENTATION

BACKGROUND OF THE INVENTION

The present invention relates to the document processing system art. It finds particular application in conjunction with image segmentation, and more particularly, a method and apparatus for distinguishing between noisy continuous tone document types and other document types identified by measures and techniques that have undesirable positive responses to video representing noisy continuous tone images, in order to maintain reliable image segmentation. However, it should be appreciated that the present invention may also find application in conjunction with other types of digital imaging systems and applications that discern how an image was rendered.

Document processing systems often need to take an image representation with a low level of organizational structure, such as a simple bit or byte per pixel rectangular video map, and infer structure to guide further processing or analysis of the image. For example, in a reprographic system a document is optically scanned and the reflectance of each pixel is converted to a multi-bit (e.g. 8-bit) digital value, forming a matrix of integers representing the original document.

Various image processing is then performed to enhance the image and convert it to a different resolution and form which can be rendered by a particular marking technology, such as a bi-level Xerographic printer. The purpose of the processing is to produce an output copy which appears to the human eye to be equal to or in some sense better than the original. Unfortunately, the appropriate image processing is different for different types of input documents, typical broad classes being text, continuous tone, and halftones of various techniques and frequencies.

Furthermore, many user originals contain more than one document type in different areas of the page, for example a magazine article with inset halftoned photographs, or text embedded in a tinted background. This explains the need to classify each document pixel, so that appropriate processing can be performed. In other applications, the pixel classification can be communicated to a subsequent process that analyzes the pixel level classification map further.

Algorithms for classifying image pixels according to document type (e.g. text, contone, halftone) make their decision based on image context in the vicinity of the pixel being classified. In the case of a halftone document type, the absolute value of the sum of the laplacians in a small area surrounding the pixel being classified (abbreviated Sij), and the halftone peak count within a context surrounding the pixel being classified, are typically used to detect halftones. However, continuous tone documents which are very noisy, or video from very noisy scanners, can fool such algorithms if enough false video peaks are detected and Sij is large enough. This results in the contone image appearing splotchy on the output document. The splotchy appearance is due to the inappropriate switching between rendering schemes based on varying peak density and Sij.

In the past these defects were not visible because the use of hysteresis or other state-based methods, along with rectangular segmentation blocks over which statistics were accumulated suppressed such errors, as did rendering TRCs designed to hide shortfalls not only in segmentation, but also in other parts of the system as well, such as the scanner.

However, recent advances in scanner technology and image segmentation, driven by the desire to more faithfully reproduce the original image, have eliminated the state-based methods and the use of rectangular segmentation blocks. TRCs no longer saturate in the dark and light areas to hide flaws in the system, but are designed to faithfully render the original document at all densities. The new segmentation schemes avoid generation of rectangular artifacts by classifying each pixel independently, precluding the possibility of neighborhood classification statistics overriding a given pixel's erroneous classification, thereby hiding errors. Thus, without state-based methods or the use of blocks over which classification statistics can be gathered to suppress errors when aberrations in the classification occur, pixels are incorrectly classified and subsequently rendered.

Accordingly, it has been considered desirable to develop a new and improved method and apparatus for distinguishing between noisy continuous tone document types and other document types identified by measures and techniques that have undesirable positive responses to video representing noisy continuous tone images, in order to maintain reliable image segmentation, that meets the above-stated needs and overcomes the foregoing difficulties and others while providing better and more advantageous results.

SUMMARY OF THE INVENTION

The present invention consists of adding a range of video requirement to a document type classification process in order to distinguish between many small video variations associated with a noisy continuous tone document type, and a smaller number of large variations associated with other document types such as halftone or text.

In accordance with one aspect of the present invention, a method for classifying a pixel of image data as one of a plurality of image types is disclosed. The method includes the steps of determining a first image characteristic value for the pixel being classified, determining a provisional classification for the pixel being classified, and assigning an image type classification to the pixel being classified based on the first image characteristic value and the provisional classification.

In accordance with another aspect of the present invention, a system for classifying a pixel of image data according to one of a plurality of image types is disclosed. The system includes a first mechanism for determining a first image characteristic value of the pixel being classified, a second mechanism for determining a provisional classification of the pixel being classified, a classifier for assigning an image type classification to the pixel being classified based on the first image characteristic value and the provisional classification, and a processor for image processing the pixel based on the image type classification of the pixel.

One advantage of the present invention is the provision of a method and apparatus for distinguishing between noisy continuous tone document types and other document types.

Another advantage of the present invention is the provision of a method and apparatus for providing reliable image segmentation.

Yet another advantage of the present invention is the provision of a method and apparatus that correctly renders noisy continuous tone document types.

A further advantage of the present invention is the provision of a method and apparatus that correctly identifies subsequent processing, utilization, or identification of higher level image semantics.

Still further advantages of the present invention will become apparent to those of ordinary skill in the art upon reading and understanding the following detailed description of the preferred embodiment.

BRIEF DESCRIPTION OF THE DRAWINGS

The invention may take form in various components and arrangements of components, and in various steps and arrangements of steps. The drawings are only for purposes of illustrating a preferred embodiment(s) and are not to be construed as limiting the invention.

DETAILED DESCRIPTION OF THE PREFERRED EMBODIMENT(S)

Figure 1:
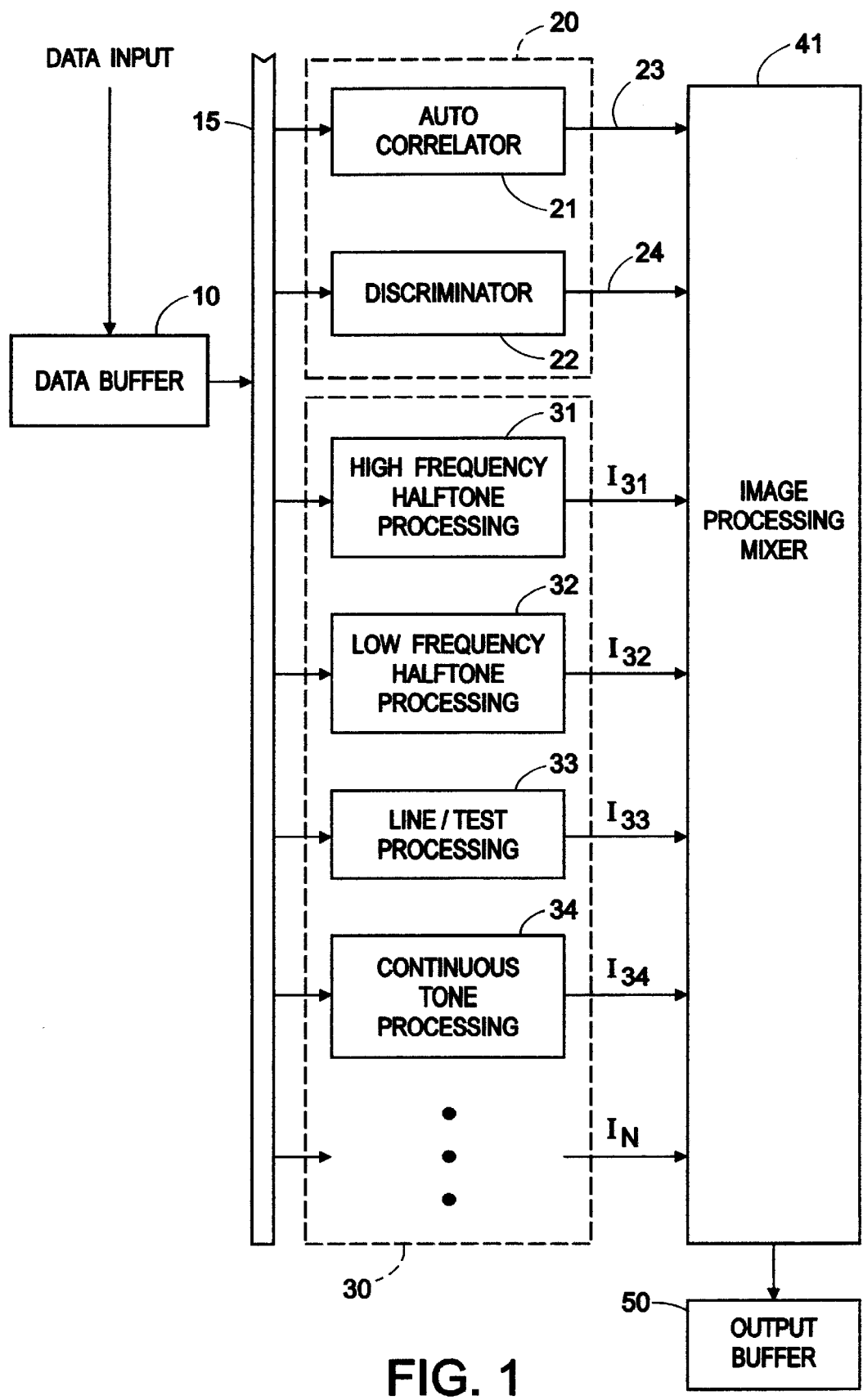
FIG. 1 is a block diagram illustrating an exemplary image processing system that incorporates the features of the present invention therein.

The following will be a detailed description of the drawings illustrated in the present invention. In this description, the terms "image data" or "pixels" in the form of video image signals, which may be either analog or digital voltage representations of an image, indicate a representation of an image provided from a suitable source. For example, the image signals may be obtained through line by line scanning of an image bearing the original by one or more photosensitive elements, such as an array of charge couple devices commonly referred to as CCDs. Line by line scanning of an image is well known and does not form a part of the present invention.

Image data may also be derived by a computer workstation program. If the original source of the video from which a workstation program is constructing an output image had its origin from a scanner, regardless of how long ago or through how many transformations it came, then the video can have noise in it. The video may also have noise if it is synthetic and has undergone lossy processing, quantization, or has had a low amplitude spatially random variation (e.g. noise) purposely combined with the image data. Thus, video from a workstation may contain noise, either originating in a physical scanner or synthetically generated and merged with the image. In content, the original video image signals may be composed entirely of a single image component such as lines, text, low frequency halftones, high frequency halftones, contones, or any combination thereof.

The following description also includes references to slowscan and fastscan digital image data when discussing the directionality of two-dimensional filtering architecture. For purposes of clarification, fastscan data is intended to refer to individual pixels located in a succession along a raster of image information, while slowscan data refers to data derived from a common raster position across multiple rasters or scanlines.

As an example, slowscan data would be used to describe signals captured from a plurality of elements along a linear photosensitive array as array is moved relative to a document. On the other hand, fastscan data would refer to the sequential signals collected along the length of the linear photosensitive array during a single exposure period which is also commonly referred to as a raster of data.

Moreover, in describing the present invention, it is assumed that the video signal has a value in a range between 0 and 255. However, any range from the video signal can be utilized in conjunction with the present invention. Furthermore, in the following description, the term "grey level" will be used to describe both black and white and color applications.

Furthermore, in describing the present invention, the term "pixel" will be utilized. This term may refer to an electrical, (or optical, if fiber optics are used), signal which represents the physical measurable optical properties at a physical definable area on a receiving medium. The receiving medium can be any tangible document, photoreceptor, or marking material transfer medium.

Moreover, the term "pixel" may refer to an electrical, (or optical, if fiber optics are used), signal which represents the physically measurable optical properties at a physically definable area on the display medium. A plurality of the physically definable areas for both situations represent the physically measurable optical properties of an entire physical image to be rendered by either a material marking device, electrically or magnetic marking device, or optical display device.

Lastly, the term "pixel," in the scanning environment, may refer to an electrical, (or optical, if fiber optics are used), signal which represents physical optical property data generated from a signal photosensor cell when scanning a physical image so as to convert the physical optical properties of the physical image to an electronic or electrical representation. In other words, in this situation, a pixel is an electrical, (or optical), representation of the physical optical properties of a physical image measured at a physical definable area on a optical sensor. The term "pixel," in the rendering environment, may refer to an electrical, (or optical, if fiber optics are used), signal which represents the smallest physical area on a recording substrate that can be rendered. In other words, in this situation, a pixel is an electrical, (or optical), representation of the physical spot created by a laser in a laser printed or the physical spot created by the smallest rendered ink droplet.

Many of the documents produced today are compound documents in that the documents are composed of several different sub-images that are of different image types or image classes. Some of the common types are text, photos (contones), and halftones. One reason for the increased appearance of compound documents is the widespread use of commercially available word processing and desktop publishing software that is able to generate them.

As is well known, different types of images require different processing in order to provide optimal image quality. Conventionally, to automatically choose the best processing for different areas of an image, each area is classified into one of several pre-defined classes to determine how to render that part of the image. This image type or image class information can then be used to determine the appropriate processing required to obtain a good rendition of the image when printing, to choose a method of image compression, to determine if optical character recognition would be useful, etc.

An exemplary automatic segmentation circuit 8 is illustrated in FIG. 1. The circuit 8 is made up of three modules. Image data stored in a data buffer 10 is simultaneously directed to an image property classifying section 20, the first module, and an image processing section 30, the second module, via a data bus 15. The image data is in its raw grey format, for example 6–8 bits per pixel, and is transferred in blocks of about 16 pixels at a time at 400 spots per inch (SPI), or 12 pixels at a time at 300 SPI.

The image data can be derived from any number of sources, including a raster input scanner, a graphics workstation, an electronic memory, or other storage element, etc. The data buffer 10 can be any suitable commercially available serial in/serial out multi-row buffer having a bit storage capacity sufficient to temporarily store lines of image pixels.

The image property classifying section 20, can include a number of submodules (e.g. halftone detector, line(text) detector, continuous tone detector, etc.) that determine whether a block of image pixels stored in the data buffer 10 is one type of imagery or another, (e.g. halftone, line/text, contone, etc.).

In parallel with the image property classifying section 20, the image processing section 30 is made up of any number of sub-processing sections, (e.g. high frequency halftone processor 31, low frequency halftone processor 32, line/text processor 33, or contone processor 34), which perform image processing operations on the same block of image pixels as section 20.

Each image sub-processing section performs image processing operations that are adapted to improve the image quality of a distinct class of imagery. The third module, control section 41, uses the information derived from the image classifying section 20, to control the image processing section 30. In other words, the control section 41 acts like a multiplexer and selects the proper processed image data according to the image classification determined by the image classifying section 20.

In a conventional image segmentation scheme, image property classifying section 20 classifies image data as one of a number of classes of imagery (e.g. high-frequency halftone, mid-frequency halftone, low-frequency halftone, line/text, contone, etc.). The image data is then processed according to the properties of the class of imagery that was selected (e.g. low-pass filter and re-screening if it's a high-frequency halftone, threshold with a random threshold if it is a low-frequency halftone, etc.).

Consequently, the control section 41 decides the type of image processing the image data requires depending on the decision made by the classification section 20. Thus, the output of classification section 20 is quantized to one of a number of different document types. The control section 41 selects the output from one of the image sub-processing sections based upon this classification.

The image property classifying section 20 utilizes a pixel-by-pixel classification process wherein each pixel is individually classified based on a context of surrounding pixels or, more particularly, the pixel values in a neighborhood of pixels surrounding the pixel to be classified. Although it is desirable for the pixel to be centered, it is not necessary. For example, the pixel being classified could be located in the lower right of the context.

In a pixel-by-pixel implementation a neighborhood or window of pixels moves along the fastscan direction one pixel at a time and along the slowscan direction one scanline at a time. In contrast, a tiled window implementation moves along the fastscan direction to the next adjoining non-overlapping neighborhood or window of pixels and moves along the slowscan direction to the next adjoining non-overlapping window of pixels.

The image property classifying section 20 measures, calculates, or otherwise determines intrinsic properties (e.g. microclassifiers) of the video extracted through a simple mathematical formula or heuristic. The microclassifiers have different values (e.g. magnitudes) when computed for images of different types. The values of one or more of the microclassifiers are then analyzed to classify the image pixel according to document type. Further, the microclassifiers can have macro heuristic or mathematical algorithms applied to them to infer a higher level of understanding from the data, suppress errors or other undesirable effects, or to reduce the quantity of data without a commensurate reduction in the information contained therein.

To characterize continuous tone verses halftone document types, a measure of energy or variation of the video is computed. In this implementation, the Laplacian of the video is first computed from Equation 1 as follows:

$$L_{i,j} = (V_{i-1,j-1} + V_{i-1,j} + V_{i-1,j+1} + V_{i,j-1} + V_{i,j+1} + V_{i+1,j-1} + V_{i+1,j} + V_{i+1,j+1})/8 - V_{i,j} \quad \text{(eq. 1)},$$

where Vij is the video of the j-th pixel in the i-th scanline, and Lij is the Laplacian of the video at the j-th pixel in the i-th scanline.

More specifically, the Laplacian Lij is simply the difference between the pixel being classified Vij and the average of its eight neighbors. After computing the Laplacian Lij, the sum of the absolute values of the Laplacians Sij over a small neighborhood of $N_X$ pixels by $N_Y$ scanlines surrounding the pixel of interest is computed. The Sij operator provides a measure of activity, or energy, within its context region. The parameter $N_X$ is typically chosen to be 7 for a 400 spot per inch image and 11 for a 600 spot per inch image, and the parameter $N_Y$ is typically chosen to be 3 for a 400 spot per inch image and 5 for a 600 spot per inch image. However, the size of the area used to determine Sij can vary such as a 5×9, 7×13, etc. context.

A pixel can be classified as, for example, a contone document type or a halftone document type depending upon the value of Sij. Generally, a larger Sij value (about 170 or greater) indicates a halftone document type, while a smaller Sij value (less than about 170) indicates a contone document type. However, Sij alone fails to differentiate between a noisy contone document type having many small variations over the entire context, and a document type having a smaller number of large variations within the context (e.g. halftone, text, etc.). In both cases, the resulting Sij value will be large, thereby indicating a halftone document type, correctly in the case of a single large variation in a few pixels within the context, and incorrectly in the case of many small variations over the entire context.

Figure 2:
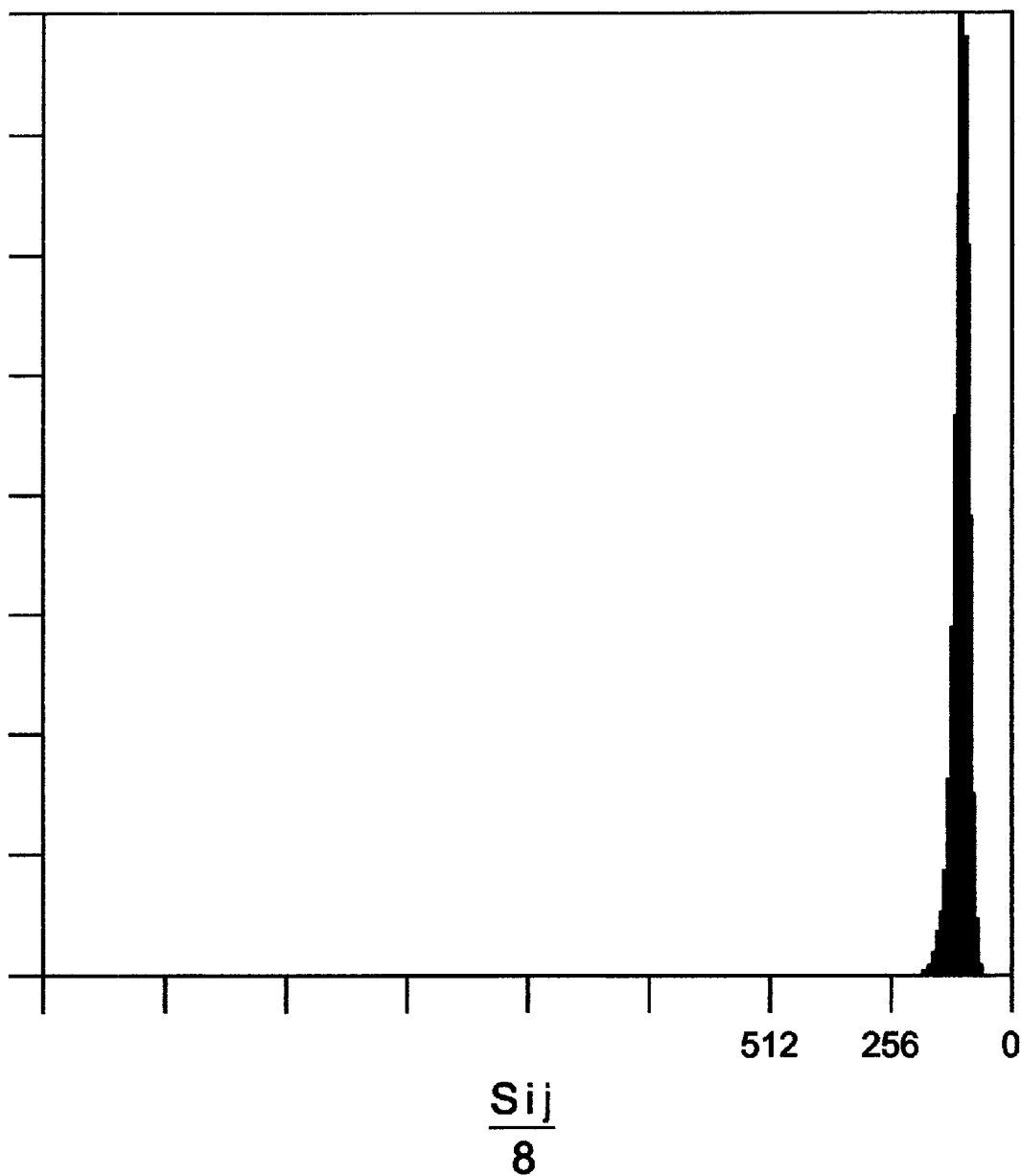
FIG. 2 is a histogram of Sij over a dark, noisy contone image.

Further, as disclosed in copending U.S. patent application Ser. No. 09/159,414 now issued as U.S. Pat. No. 6,128,408 and filed on the same date herewith, Sij can be augmented in light and dark regions of an image to facilitate reliable halftone detection. FIG. 2 is a histogram of Sij over a dark, noisy contone input image. Note that Sij is mostly below a typical halftone threshold of 170, but because this video is dark, Sij will be augmented by, for example, 70–80 to ensure reliable halftone detection. This allows the video's Sij to easily meet the halftone detection algorithm's Sij criteria. Further, because the video is noisy, enough false peaks are detected to meet the estimated halftone frequency criteria. Accordingly, the image property classifying section 20 may incorrectly render the pixel being classified as a halftone document type rather than as a contone document type.

It should be appreciated that microclassifiers other than Sij can have an undesirable response to noisy contone. For example, a peak counter, from which estimated halftone frequency is derived, can have an undesirable response to a noisy contone video. In both cases, to prevent a pixel from being misclassified as something other than a noisy contone document type, a Range of Video microclassifier Rij can be added to the other classification tests. The Range of Video microclassifier Rij separates the many small video variations from a smaller number of large video variations, thereby enabling the noisy contone document type to be differentiated from other document types. The Range of Video microclassifier Rij is defined as the difference between the largest and smallest video value within a context of pixels in the vicinity of the pixel being classified. In a preferred embodiment, Rij can be determined from a 5×5 context of pixels centered on the pixel being classified. Thus, Range of Video Rij can be determined from Equation 2 as follows:

$$Rij = V_{MAX} - V_{MIN}, \qquad (Eq. 2)$$

where Rij is the Range of Video for the j-th pixel in the i-th scanline, $V_{MAX}$ is the largest video value within a context of pixels in the vicinity of the pixel being classified, and $V_{MIN}$ is the smallest video value within the same context of pixels.

The magnitude of the Rij microclassifier determined in accordance with Equation 2 can be applied to the following microclassification rule expressed in pseudo code as:

If (PROVISIONAL CLASSIFICATION indicates other document types (e.g. halftone or text) AND Rij<= $R_{THRESH}$)
then
    Class=CONTONE, where the PROVISIONAL CLASSIFICATION is based on applying mathematical and/or heuristic algorithms to one or more microclassifiers derived from the video image data, for example, the absolute value of the sum of Laplacians Sij, estimated halftone frequency, etc.; Rij is the Range of Video within a context of pixels in the vicinity of the pixel being classified; and $R_{THRESH}$ is the maximum range value required for a pixel to be classified as contone. Thus, the PROVISIONAL CLASSIFICATION of a pixel being classified is simply an initial classification that is conditioned upon the Range of Video value Rij.

Figure 3:
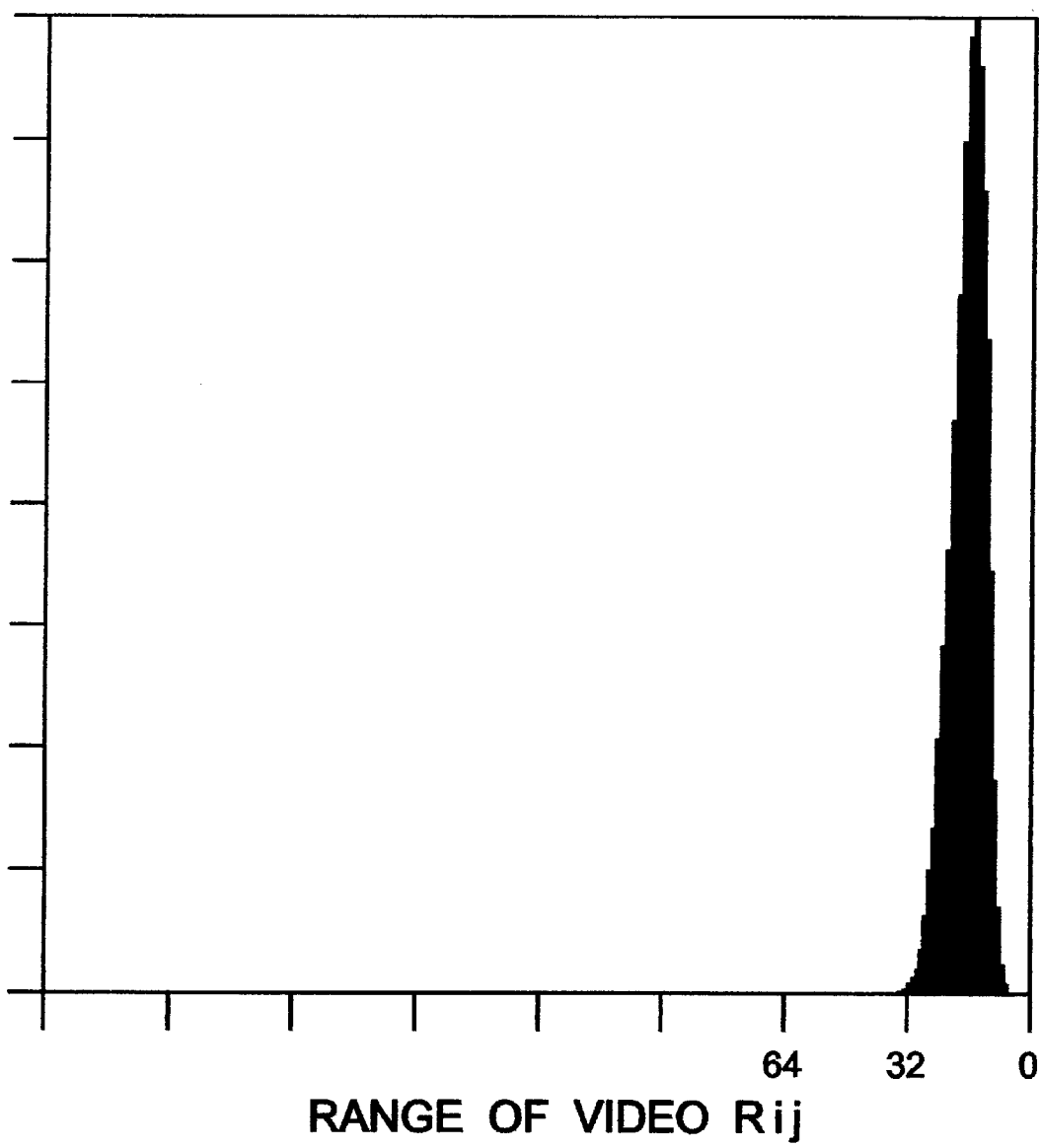
FIG. 3 is a histogram of a Range of Video over the same dark, noisy contone image used to create the histogram of FIG. 2.

FIG. 3 is a histogram of the magnitude of the Range of Video classifier over the same dark, noisy contone image used to create the histogram of FIG. 2. The Range of Video is less than about 32 for almost all pixels. If the input image was a halftoned document type, the input image would consist of very white and very dark pixels with little in between, producing a Range of Video value of around 200. Even small halftoned dots attenuated by system modulation transfer function (MTF) would be expected to have a larger range of video than 30. For the same reasons, the edges of text produce similar Range values. Empirically, it has been determined that the Range of Video threshold $R_{THRESH}$ of about 28 is small enough to enable reliable classification of a legitimate halftone or text pixel when used in conjunction with other microclassifiers (e.g. Sij), while forcing the classification to CONTONE in the case of noisy continuous tone video image data. The appropriate threshold level for any given system depends on a number of characteristics of that particular system, such as signal to noise ratio, optical MTF, and electronic video bandwidth.

Although the present invention has been described in detail above, various modifications can be implemented without departing from the spirit of the present invention. For example, the preferred embodiment of the present invention has been described with respect to a xerographic printing system; however, the present invention is readily implemented in a thermal inkjet system, a display system, or other image processing system.

Moreover, the image processing system of the present invention can be readily implemented on a general purpose computer, a personal computer or workstation. The image processing system of the present invention can be readily implemented in software or hardware, such as on an ASIC, thereby enabling the placement of this process in a scanner, electronic subsystem, printer, or display device.

The present invention has been described with respect to a video range of 0 to 255. However, it is contemplated by the present invention that the video range can be any suitable range to describe the grey level of the pixel being processed. Furthermore, the present invention is readily applicable to any image processing system, not necessarily a binary output device.

Lastly, the present invention is readily applicable with respect to a monochrome or black/white environment, and a color environment. Namely, the processing operations of the present invention can be applied to each color space value, some function of a given pixel's color space components, or even a function of the color space components of a pixel and other pixels in the neighborhood.

While the invention has been described with reference to a preferred embodiment, it is not confined to the details set forth above, but is intended to cover such modifications or changes as may come within the scope of the attached claims.

Having thus described the preferred embodiment(s), the invention is now claimed to be:

1. A method for classifying a pixel of image data as one of a plurality of image types, comprising the steps of:
    (a) determining a maximum video value within a context of pixels in a vicinity of the pixel being classified;
    (b) determining a minimum video value within the context of pixels;
    (c) determining a range of video value for the pixel being classified by subtracting the minimum video value from the maximum video value;
    (d) determining a conditional document type classification for the pixel being classified;
    (e) comparing the range of video value with a predetermined threshold value;
    (f) classifying the pixel as a contone document type when the range of video value is less than the threshold value; and
    (g) classifying the pixel as the conditional document type when the range of video value is greater than the threshold value.

2. The method as claimed in claim 1, wherein step (c) includes the step of:
    (h) determining the range of video value for a context of pixels in a vicinity of the pixel being classified.

3. The method as claimed in claim 1, wherein step (d) includes the step of:
    (h) determining the conditional document type classification based on at least an absolute value of the sum of the laplacians for the pixel being classified.

4. The method as claimed in claim (1), wherein step (a) includes the step of:
    (h) centering the context of pixels on the pixel being classified.

5. The method as claimed in claim 1, wherein step (a) includes the step of:
    (h) determining the range of video value for a 5×5 context of pixels in a vicinity of the pixel being classified.

6. The method as claimed in claim 1, further including the steps of:
    (h) processing the pixel based on the conditional document type classification of the pixel, and
    (i) rendering the image processed pixel.

7. The method as claimed in claim 1, further including the steps of:
  (h) processing the pixel based on a contone document type classification of the pixel, and
  (i) rendering the image processed pixel.

8. A method for classifying a pixel of image data as one of a plurality of image types, comprising the steps of:
  (a) determining a maximum video value within a context of pixels in a vicinity of the pixel being classified;
  (b) determining a minimum video value within the context of pixels;
  (c) determining a range of video value for the pixel being classified by subtracting the minimum video value from the maximum video value;
  (d) separating a large number of small video variations from a small number of large video variations;
  (e) determining a conditional document type classification for the pixel being classified;
  (f) comparing the range of video value with a predetermined threshold value;
  (g) classifying the pixel as a contone document type when the range of video value is less than the threshold value; and
  (h) classifying the pixel as the conditional document type when the range of video value is greater than the threshold value.

9. The method as claimed in claim 8, wherein the subtracting the minimum video value from the maximum video value is determined by an equation expressed as $Rij = V_{MAX} - V_{MIN}$.

10. The method as claimed in claim 8, wherein a noisy contone document is differentiated from other document types.

11. A method for classifying a pixel in image signals, comprising the steps of:
  (a) determining a maximum video value within a context of pixels in a vicinity of the pixel being classified;
  (b) determining a minimum video value within the context of pixels;
  (c) determining a range of video value for the pixel being classified by subtracting the minimum video value from the maximum video value;
  (d) separating a large number of small video variations from a small number of large video variations;
  (e) determining a conditional document type classification for the pixel being classified;
  (f) comparing the range of video value with a predetermined threshold value;
  (g) classifying the pixel as a contone document type when the range of video value is less than the threshold value;
  (h) classifying the pixel as the conditional document type when the range of video value is greater than the threshold value;
  (i) processing the pixel based on the image type classification of the pixel, and
  (j) rendering the image processed pixel.

* * * * *